United States Patent [19]

Lim

[11] Patent Number: 5,638,126
[45] Date of Patent: Jun. 10, 1997

[54] METHOD AND APPARATUS FOR DECIDING QUANTIZATION PARAMETER

[75] Inventor: Jong-Tae Lim, Seoul, Rep. of Korea

[73] Assignee: Daewoo Electronics Co., Ltd., Seoul, Rep. of Korea

[21] Appl. No.: 571,568

[22] Filed: Dec. 13, 1995

[30] Foreign Application Priority Data

Dec. 14, 1994 [KR] Rep. of Korea ............ 94-34106

[51] Int. Cl.$^6$ ............................................. H04N 7/30
[52] U.S. Cl. ............................................. 348/405
[58] Field of Search ............................. 348/405, 419, 348/699; 382/251

[56] References Cited

U.S. PATENT DOCUMENTS

| | | | |
|---|---|---|---|
| 5,317,397 | 5/1994 | Odaka et al. | 348/699 |
| 5,489,944 | 2/1996 | Jo | 348/405 |
| 5,515,105 | 5/1996 | Lim | 348/405 |

*Primary Examiner*—Amelia Au
*Attorney, Agent, or Firm*—Anderson Kill & Olick P.C.

[57] ABSTRACT

A quantization parameter is decided in response to input data and a control signal for use in a video signal encoding device which quantizes and encodes the input data and transmits the encoded data by way of a buffer, wherein the control signal representing the degree of fullness of the buffer. The apparatus for deciding the quantization parameter comprises: a circuit, in response to the control signal, for deciding a current candidate quantization parameter for each of the slices of a current frame; a circuit for generating a slice number signal identifying the slice of the current frame that is being processed; memory for storing the current candidate quantization parameter in case the slice number signal indicates that a second slice of the current frame is being processed; and a circuit for selecting the previous candidate quantization parameter for a second slice of a preceding frame previously stored at the memory as the quantization parameter in case the slice number signal indicates that a first slice of the current frame is being processed; and for selecting the current candidate quantization parameter as the quantization parameter in case the slice number signal denotes that remaining slices of the current frame is being processed.

2 Claims, 1 Drawing Sheet

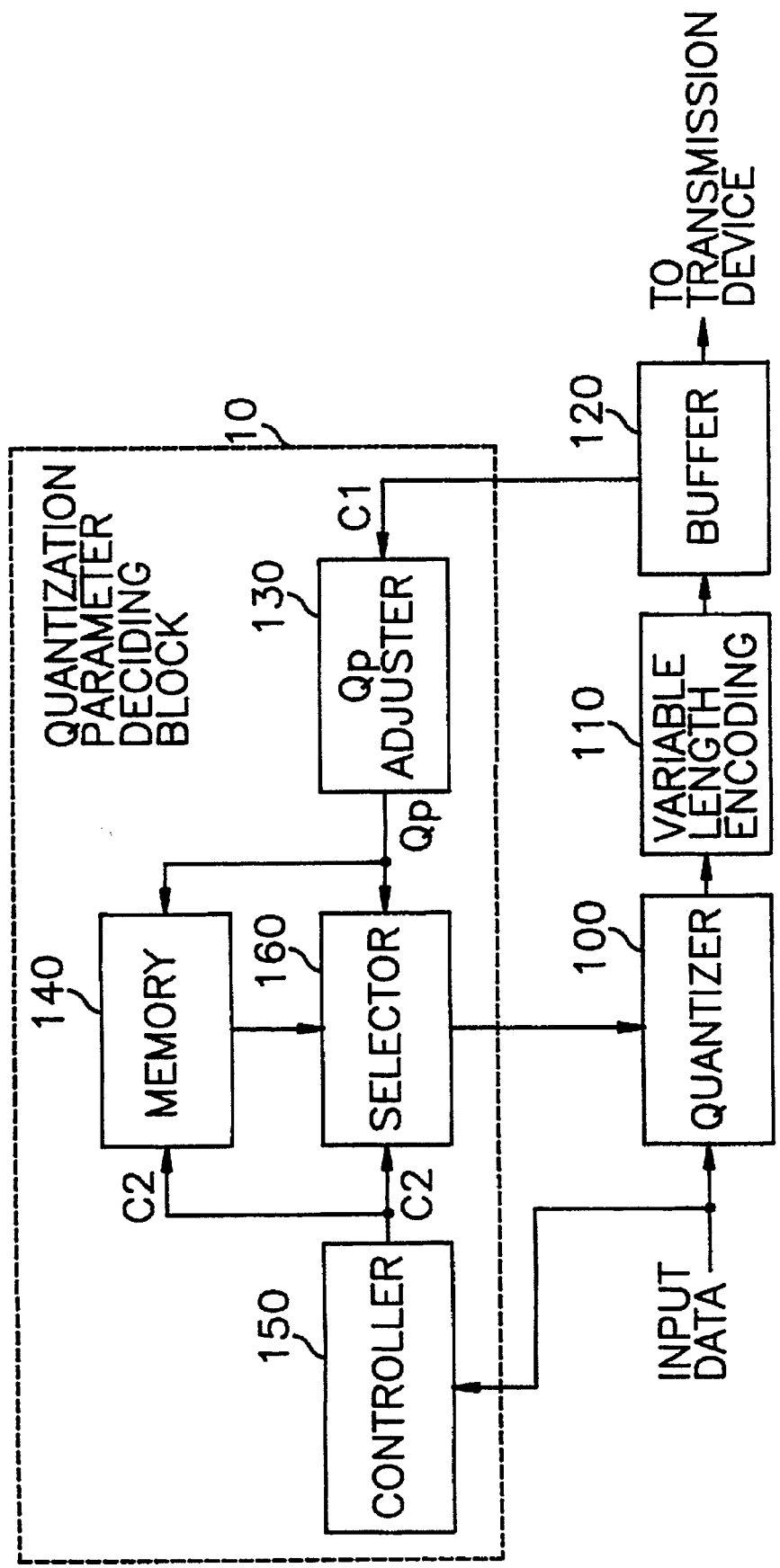

METHOD AND APPARATUS FOR DECIDING QUANTIZATION PARAMETER

FIELD OF THE INVENTION

The invention relates to a video signal encoding apparatus; and, more particularly, to a method and an apparatus for deciding a step size for quantizing transform coefficients derived from a video signal to be transmitted, to thereby improve the quality of the transmitted video signal.

DESCRIPTION OF THE PRIOR ART

In various electronic applications such as high definition TV and video telephone systems, a video signal may be transmitted in a digital form. When the video signal comprising a sequence of video "frames" is expressed in a digital form, there occurs a substantial amount of digital data: for each line of a video frame is defined by a sequence of digital data elements referred to as "pixels". Since, however, the available frequency bandwidth of a conventional transmission channel is limited, in order to transmit the substantial amounts of digital data through the fixed channel, a video signal encoding apparatus is normally used to compress the digital data.

Conventional video signal encoding apparatus typically includes a transform coder, e.g., DCT (Discrete Cosine Transform) coder, which sequentially converts a plurality of blocks of, e.g., 8×8, pixels contained in a video frame signal into a plurality of blocks of 8×8 transform coefficients. The transform coefficient blocks are sequentially processed in a quantization circuit wherein they are converted into quantized data. The quantized data is further processed by using, e.g., a run-length coding and a variable length coding and fed to a buffer. The transformed data is temporarily stored in the buffer and provided therefrom to, e.g., a transmission device.

In the video signal encoding apparatus, the manner of quantizing the transform coefficient blocks determines the bit rate of the encoded video signal and dictates the quality of the video signal reconstructed from the encoded video signal. The conventional quantization circuit, in order to carry out the quantization, includes a quantizer step size matrix whose quantization step size is controlled by using the so-called quantization parameter as set forth in the video coding syntax of the Motion Picture Expert Group (MPEG) contained in the International Standards Organization(ISO) Standard Committee Draft 11172-2.

The quantization step size directly controls the bit rate of the encoded video signal and the coarseness/fineness of the quantization employed in developing the encoded video signal. That is, a smaller quantization step size entails a greater amount of data requiring a larger number of code bits for the representation thereof, whereas a bigger quantization step size results in a lower volume of data needing a fewer number of code bits for their representation. And, a larger number of code bits can represent a frame of video signal more precisely than a fewer number of code bits. Therefore, in order to achieve a maximum picture quality for a particular predetermined target bit rate, the quantization parameter need be appropriately selected.

The image data processed in a conventional encoding device is comprised of a plurality of frames, each frame including a multiplicity of slices and each slice having a number of macroblocks, each macroblock being a set of predetermined number of blocks.

In the prior art encoding device, the quantization parameter is readjusted at the start of each slice and can also be reset at the start of a macroblock as described below.

One simple algorithm for deciding the quantization parameter is to monitor the buffer fullness. That is, if the buffer is heading towards an overflow, the quantization step size should be increased; and if the buffer is at a lower level of occupancy, the quantization step size should be reduced.

Another method for deciding the quantization parameter take into account local image contents as well as the buffer fullness. Specifically, the quantization step size is adjusted to a small value in smooth areas of an image frame and is set to a large value in busy areas. This technique reduces the visibility of blockiness in smooth areas at the expense of increased quantization noise in the busy areas where, however, it is masked by the image detail.

In the conventional scheme described above, a quantization parameter for a slice of an image frame is decided based largely on the buffer fullness and the busyness of a previous slice except when it is decided on a macroblock basis.

However, in deciding the quantization parameter for a first slice of a current frame of the video signal, it may not be appropriate to consider the previous slice, i.e., the last slice in the preceding frame, because the characteristic of the last slice of the preceding frame may be quite different from that of the first slice of the current frame. Therefore, it is desirable to devise a scheme that considers other image characteristics than the busyness of a previous slice in deciding the quantization parameter for a first slice in a current frame.

SUMMARY OF THE INVENTION

It is, therefore, a primary object of this invention to provide an improved video signal encoding apparatus wherein an improved picture quality is attained by deciding the quantization parameter for a first slice of a current frame based on the quantization parameter for a second slice in a preceding frame and deciding the quantization parameters for the remaining slices of the current frame depending on the fullness of a buffer which controls an encoded data stream.

In accordance with the invention, there is provided an apparatus, for generating a quantization parameter which determines a quantization step size in response to input data and a control signal, for use in a video signal encoding device which quantizes and encodes the input data and transmits the encoded data via a buffer, wherein the input data includes a plurality of frames, each of the frames consisting of a multiplicity of slices, and the control signal representing the degree of fullness of the buffer, the apparatus comprising:

means, in response to the control signal, for deciding a current candidate quantization parameter for each of the slices of a current frame;

means, in response to the input data, for generating a slice number signal identifying the slice of the current frame that is being processed at the video signal encoding device;

memory means for storing the current candidate quantization parameter in case the slice number signal indicates that a second slice of the current frame is processed at the video signal coding encoding device; and means for selecting a previous candidate quantization parameter for a second slice of a preceding frame previously stored at the memory means as the quantization parameter in case the slice number signal indicates that a first slice of the current frame is being processed; and for selecting the current candidate quantization parameter as the quantization parameter in case the slice number signal indicates that one of other slices of the current frame than the first slice is being processed.

BRIEF DESCRIPTION OF THE DRAWINGS

The above and other objects and features of the present invention will become apparent from the following description of preferred embodiments given in conjunction with the accompanying drawing which represents a block diagram of a video signal encoding device employing the inventive quantizer parameter deciding scheme.

DETAILED DESCRIPTION OF THE PREFERRED EMBODIMENTS

Referring to the drawing, there is provided a block diagram of a video signal encoding device employing the inventive quantization parameter deciding scheme.

Input data to the inventive encoding device is in the form of blocks of transform coefficients which have been obtained by subjecting image data to a discrete cosine transform. The input data is fed to a quantizer 100 for the quantization thereof based on a quantization parameter decided at a quantization parameter deciding block 10.

Specifically, the quantizer 100 has a memory for storing a matrix of base quantization step sizes. The base quantization step sizes are arranged such that one base step size corresponds to one of the transform coefficients contained in each transform coefficient block (see International Standard Organization(ISO) Standard Committee Draft 11172-2).

In addition to the transform coefficient blocks, the quantizer 100 also receives, from the quantization parameter deciding block 10, a quantization parameter Qp. The quantizer 100 uses the base quantization step size matrix and the quantization parameter to generate quantized data, a quantized version of a transform coefficient block, as its output. The actual quantization step size to be employed for quantizing each coefficient of a transform coefficient block is developed by multiplying the quantization parameter Qp with a respective base element of the base quantization step size matrix.

The quantized data is then coupled to a conventional variable length encoding block 110 which serves to generate encoded video data by employing, e.g., a run-length coding and a Huffman coding techniques.

The encoded video data is temporarily stored in a buffer 120 and then transmitted via a transmission circuit to a receiver (not shown).

The quantization parameter deciding block 10 includes a Qp adjuster 130, a memory 140, a controller 150 and a selector 160.

A signal C1 denoting the degree of fullness of the buffer 120 is also coupled to the Qp adjuster 130. At the Qp adjuster 130, the quantization parameter is determined depending upon the degree of fullness of the buffer 120 in a same manner as the prior art quantization parameter deciding scheme. Qp decided at the Qp adjuster 130 is fed to the selector 160 and to the memory 140.

The input data is also fed to the controller 150. In response to the input data, the controller 150 generates a slice number signal C2 representing which slice of a frame is being currently processed at the encoding device.

At the memory 140, in response to the slice number signal C2 from the controller 150, Qp for a second slice of each frame is stored therein. That is, when Qp for a second slice of a current frame, a frame being currently processed, is fed to the memory 140, the content of the memory 140, i.e., Qp for a second slice of a previous frame, is updated to said Qp for the second slice of the current frame. Qp for other slices are not stored. The stored Qp is fed to the selector 160.

At the selector 160, in response to C2, either the Qp from the Qp adjuster 130 or the Qp stored at the memory 140 is selected. If C2 indicates that a first slice of the current frame is being processed, the Qp stored at the memory 140 is selected; and if C2 indicates that one of other sliced than the first one is being processed, the Qp from the Qp adjuster 130 is selected. In other words, the Qp for the second slice of the previous frame is decided as the Qp for the first slice of the current frame; and except for the first slice, Qp is decided according to the buffer fullness.

As is well known, in most cases, the image characteristics of the current frame are similar to those of the preceding frame and, therefore, the image characteristics of the first slice of the current frame are not much different from those of the second slice of the preceding frame. From this, it can be said that it is more efficient to use the Qp for the second slice of the preceding frame as the Qp for the first slice of the current frame than to decide it according to the buffer fullness which is mostly influenced by the characteristics of the last slice of the preceding frame. In addition, it can be easily seen that the Qp for the first slice of the preceding frame cannot be used as Qp for the first slice of the current frame for, in such event, Qp's for the first slices of all frames will become the same.

While the present invention has been described with respect to certain preferred embodiments only, other modifications and variations may be made without departing from the spirit and scope of the present invention as set forth in the following claims.

What is claimed is:

1. An apparatus, for generating a quantization parameter which determines a quantization step size in response to input data and a control signal, for use in a video signal encoding device which quantizes and encodes the input data and transmits the encoded data via a buffer, wherein the input data includes a plurality of frames, each of the frames consisting of a multiplicity of slices, and the control signal representing the degree of fullness of the buffer, the apparatus comprising:

means, in response to the control signal, for deciding a current candidate quantization parameter for each of the slices of a current frame;

means, in response to the input data, for generating a slice number signal identifying the slice of the current frame that is being processed at the video signal encoding device;

memory means for storing the current candidate quantization parameter when the slice number signal indicates that a second slice of the current frame is processed at the video signal coding encoding device; and means for selecting a previous candidate quantization parameter of a second slice of a preceding frame previously stored at the memory means as the quantization parameter when the slice number signal indicates that a first slice of the current frame is being processed; and for selecting the current candidate quantization parameter as the quantization parameter when the slice number signal indicates that one of other slices of the current frame than the first slice is being processed.

2. A method, for generating a quantization parameter which determines a quantization step size in response to input data and a control signal, for use in a video signal encoding device which quantizes and encodes the input data and transmits the encoded data via a buffer, wherein the input data includes a plurality of frames, each of the frames consisting of a multiplicity of slices, and the control signal representing the degree of fullness of the buffer, the method comprising the steps of:

(a) deciding a current candidate quantization parameter for each of the slices of a current frame in response to the control signal;

(b) generating a slice number signal identifying the slice of the current frame that is being processed at the video signal encoding device;

(c) storing the current candidate quantization parameter when the slice number signal indicates that a second slice of the current frame is being processed at the video signal coding encoding device; and (d) selecting a previous candidate quantization parameter of a second slice of a preceding frame previously stored at step (c) as the quantization parameter when the slice number signal indicates that a first slice of the current frame is being processed; and selecting the current candidate quantization parameter decided at step (a) as the quantization parameter when the slice number signal indicates that one of other slices of the current frame than the first slice is being processed.

* * * * *